United States Patent
Bian et al.

(10) Patent No.: US 7,300,713 B2
(45) Date of Patent: Nov. 27, 2007

(54) MAGNETIC THIN FILM MEDIA WITH AN UNDERLAYER OF CRMOZR, CRMONB OR CRMOMN

(75) Inventors: Xiaoping Bian, San Jose, CA (US); Jack Chang, Fremont, CA (US); Ernesto E. Marinero, Saratoga, CA (US); Mohammad Mirzamaani, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 454 days.

(21) Appl. No.: 10/976,557

(22) Filed: Oct. 29, 2004

(65) Prior Publication Data

US 2006/0093866 A1  May 4, 2006

(51) Int. Cl.
*G11B 5/66* (2006.01)
*G11B 5/70* (2006.01)
(52) U.S. Cl. .................. 428/831; 428/827; 427/131
(58) Field of Classification Search ............ None
See application file for complete search history.

(56) References Cited

U.S. PATENT DOCUMENTS

| | | | |
|---|---|---|---|
| 5,490,809 A | 2/1996 | Jones et al. | |
| 5,993,956 A * | 11/1999 | Lambeth et al. | 428/332 |
| 6,183,860 B1 | 2/2001 | Cheng et al. | |
| 6,287,429 B1 * | 9/2001 | Moroishi et al. | 204/192.2 |
| 6,567,236 B1 | 5/2003 | Doerner et al. | |
| 6,596,409 B2 | 7/2003 | Bian et al. | |
| 2005/0069733 A1* | 3/2005 | Ajan et al. | 428/694 TS |

OTHER PUBLICATIONS

Lai et al. "Effects of alloying additions in the CrMo underlayer on the grain size and magnetic properties of CoCrPt longitudinal media", May 2003, J Appl Phys, vol. 93, No. 10, pp. 8468-8470.*

* cited by examiner

*Primary Examiner*—Holly Rickman
(74) *Attorney, Agent, or Firm*—G. Marlin Knight

(57) ABSTRACT

A thin film disk for use in magnetic recording with an underlayer structure that includes a layer of CrMoZr, CrMoNb or CrMoMn is described. The preferred embodiment includes a circumferentially textured glass substrate, a pre-seed layer, a B2 seed layer, an underlayer structure and a magnetic layer stack with a plurality of layers. The preferred underlayer structure has a first underlayer of CrTi followed by a second underlayer of CrMoZr. The preferred B2 seed layer material is RuAl. The preferred pre-seed layer is CrTiAl. The preferred magnetic layer stack is CoCr/CoPtCrB/CoPtCrBCu. The preferred embodiment is useful for longitudinal magnetic recording. The in-plane crystallographic orientation, the Mrt orientation ratio and the media SNR are improved by the inclusion of the CrMoZr, CrMoNb or CrMoMn according to the invention.

27 Claims, 2 Drawing Sheets

MAGNETIC THIN FILM MEDIA WITH AN UNDERLAYER OF CRMOZR, CRMONB OR CRMOMN

RELATED APPLICATIONS

Co-pending, commonly assigned U.S. patent application bearing Ser. No. 10/608,866 filed on Jun. 26, 2003 describes the use of an amorphous or nanocrystalline CrAlTi as a pre-seed layer. Co-pending, commonly assigned U.S. patent applications bearing Ser. Nos. 09/798,235 and 10/059,780 describe the use of amorphous or nanocrystalline CrTi as a pre-seed layer. Co-pending, commonly assigned U.S. patent application bearing Ser. No. 10/931,642 filed on Aug. 31, 2004 describes the use of CoPtCrBCu as the upper layer in a master layer of an antiferromagnetically coupled (AFC) magnetic layer stack.

FIELD OF THE INVENTION

The invention relates to magnetic thin film media and methods for their fabrication and more particularly to materials for underlayers deposited prior to the ferromagnetic layers.

BACKGROUND OF THE INVENTION

A typical prior art a disk drive system 10 using longitudinal recording is illustrated in FIG. 1. In operation the magnetic transducer (head) 20 is supported by a suspension (not shown) as it flies above the rotating disk 16. The magnetic transducer 20, usually called a "head" or "slider," is composed of elements that perform the task of writing magnetic transitions (the write head 23) and reading the magnetic transitions (the read head 12). The magnetic transducer 20 is positioned over points at varying radial distances from the center of the disk 16 to read and write circular tracks (not shown). The disk 16 is attached to a spindle (not shown) driven by a spindle motor (not shown) to rotate the disk 16. The disk 16 comprises a substrate 26 on which a plurality of thin films 21 are deposited. The thin films 21 include ferromagnetic material in which the write head 23 records the magnetic transitions in which information is encoded.

Reference is made to FIG. 2 to illustrate the thin film layers in a particular embodiment of a magnetic film disk 16. The substrate 26 is glass. An initial thin film deposited on the substrate will be called a pre-seed layer 31. The use of pre-seed layers is relatively recent practice. The pre-seed layer is an amorphous or nanocrystalline thin film that is deposited on the substrate prior to the crystalline seed layer. The behavior of the pre-seed layer is as an amorphous material, but it is known in the art that amorphous behavior can result from materials which have a nanocrystalline structure. The preseed layer helps to improve media magnetic properties and recording performance and provide improved mechanical properties for the disk. The seed layer 32 is deposited onto the pre-seed layer. Seed layers are commonly used with nonmetallic substrate materials such as glass. Typically the seed layer is the first crystalline film deposited in the structure and is followed by one or more crystalline underlayers. Typically both the pre-seed layer and seed layer are relatively thin layers. Materials proposed for use as seed layers include chromium, titanium, tantalum, $Ni_3P$, MgO, carbon, tungsten, AlN, FeAl, NiAl and RuAl. In U.S. Pat. No. 5,789,056 to Bian, et al., the use of a CrTi seed layer is described. The use of two seed layers is also known.

The films also include one or more underlayers 33 which are commonly chromium or chromium alloy such as CrV and CrTi. The magnetic layer stack 34 includes at least one ferromagnetic layer based on various alloys of cobalt. For example, a commonly used alloy is CoPtCr. Additional elements such as tantalum and boron are often used in the magnetic alloy. A protective overcoat layer 35 is used to improve wearability and corrosion resistance.

The preferred orientation (PO) of the various crystalline materials forming the layers on the disk, as discussed herein, is not necessarily an exclusive orientation which may be found in the material, but is merely the most prominent orientation. When the Cr alloy underlayer is sputter deposited at a sufficiently elevated temperature on a NiP-coated AlMg substrate a [200] PO is usually formed. This PO promotes the epitaxial growth of [11-20] PO of the hexagonal close-packed (hcp) cobalt (Co) alloy, and thereby improves the magnetic performance of the disk. The [11-20] PO refers to a film of hexagonal structure whose (11-20) planes are predominantly parallel to the surface of the film. Likewise the [10-10] PO refers to a film of hexagonal structure whose (10-10) planes are predominantly parallel to the surface of the film. The [10-10] PO can be epitaxially grown on an appropriate underlayer with a PO of [112].

One technique used in the prior art to improve magnetic recording performance on thin film disks is circumferential polishing to create a pattern of fine "scratches" (circumferential texture) which are generally oriented along tracks (concentric circles) on the disk surface. The scale of the texture of commercial thin film disks is microscopic with a peak-to-valley of less than 5 nm typically. A 5 nm texture appears mirror-like to the unaided eye. Special polishing equipment is necessary to achieve circumferential texture this fine such as is described in Jones, et al., U.S. Pat. No. 5,490,809. The topography of the surface on which a thin film is deposited can have a significant effect on the way the film nucleates and grows and also upon its characteristics. Circumferential texture on magnetic disks has been commonly used to influence the in-plane magnetic anisotropy for a wide range of magnetic alloys. For longitudinal recording it is sometimes useful to have a higher coercivity (Hc) in the circumferential direction than in the radial direction. The ratio of the circumferential Hc to the radial Hc is called the Hc orientation ratio (HcOR). The ratio of the circumferential Mrt to the radial Mrt is called the Mrt orientation ratio (MrtOR). Current disks typically use hexagonal close packed (hcp) cobalt alloys and most (but not all) circumferentially textured disks have an Hc and Mrt OR>1.

U.S. Pat. No. 6,567,236 to Doerner, et al., describes a preferred embodiment of a layer structure as: a pre-seed layer preferably of CrTi, a seed layer preferably of RuAl, an underlayer preferably of CrTi, a bottom ferromagnetic layer preferably of CoCr, an antiferromagnetic coupling/spacer layer preferably of Ru; and a top ferromagnetic structure including: a thin first sublayer of material preferably of CoCr, CoCrB or CoPtCrB, and a thicker second sublayer of material preferably of CoPtCrB with a lower moment than the first sublayer.

A thin film disk is described in U.S. Pat. No. 6,596,409 to Bian, et al. that includes a pre-seed layer of amorphous or nanocrystalline structure which may be CrTa or AlTi or AlTa, and that is deposited upon a disk substrate. The pre-seed layer is followed by the RuAl seed layer, a Cr alloy underlayer, an onset layer composed essentially of CoCr and a magnetic layer. The onset layer has an optimal concentration of 28-33 at. % Cr and an optimal thickness of 0.5 to 2.5 nm. It increases coercivity and improves the Signal-to-Noise Ratio (SNR) of the disk. CrTi or CrMo alloys are preferred to form the underlayer.

U.S. Pat. No. 6,287,429 to Moroishi, et al. describes a magnetic recording medium in which an underlayer (called an "intermediate layer" in the text) is formed on the substrate surface, and a magnetic layer formed on the underlayer. The underlayer is composed of chromium (Cr), molybdenum (Mo) and zirconium (Zr) between 0.1 atomic percent (at. %) and 30 atomic percent which is said to improve the coercivity with Zr between 0.1 atomic percent and 4 at. % being preferred. The underlayer can include first and second sublayers. The first sublayer is composed of chromium and is formed on the substrate surface. The second sublayer comprises chromium and molybdenum and is formed on the first layer. An embodiment with an underlayer of CrMoZr and a magnetic layer composed of CoPtMo is described.

Y. Cheng, et al. in U.S. Pat. No. 6,183,860 describe magnetic recording media having a CrMo underlayer preferably with the Mo crystals being at least about 140 ANG. in the film growth direction for the (002) crystal plane preferably with a magnetic layer such as CoCrTaPtNi. Mo in the range between about 7 and 16 at. % in the CrMo alloy, more preferably between about 9 and 11 at. %, will provide the preferred (002) crystal orientation.

SUMMARY OF THE INVENTION

A thin film disk for use in magnetic recording with an underlayer structure that includes a layer of CrMoZr, CrMoNb or CrMoMn is described. The preferred embodiment includes a circumferentially textured glass substrate, a pre-seed layer, a B2 seed layer, an underlayer structure and a magnetic layer stack with a plurality of layers. The preferred underlayer structure has a first underlayer of CrTi followed by a second underlayer of CrMoZr. The preferred B2 seed layer material is RuAl. The preferred pre-seed layer is CrTiAl. The preferred magnetic layer stack is CoCr/ CoPtCrB/ CoPtCrBCu. The preferred embodiment is useful for longitudinal recording. The in-plane crystallographic orientation, the Mrt orientation ratio and the SNR are improved.

DETAILED DESCRIPTION OF THE INVENTION AND THE PREFERRED EMBODIMENTS

For longitudinal media on glass or other nonmetallic substrates, it is important to maximize the c-axis in-plane crystallographic orientation and maintain the orientation ratio. Some thin film layer materials contribute to good in-plane c-axis orientation when used on smooth or randomly polished substrates, but turn out not to be satisfactory for used on circumferential textured substrates because they produce a much lower orientation ratio (OR). The underlayer structure described herein includes a layer of CrMoZr and is particularly suited to use on circumferential textured substrates since it helps achieve a good in-plane c-axis orientation, as well as, a high orientation ratio. The CrMoZr underlayer according to the invention is very thin (with 10 angstroms being the preferred thickness). The thin CrMoZr layer is inserted between a CrTi underlayer and a CoCr ferromagnetic layer. The improved performance is believed to be due to the bridging of the lattice structure which reduces the lattice mismatch between CrTi and CoCr layers. A probable reason for the improvement seen when adding Zr to CrMo is Zr's immiscibility in bulk with Cr which results in a tendency for the Zr to phase segregate from the CrMo. Therefore, other elements such as niobium (Nb) and manganese (Mn) which are also immiscibile in bulk with Cr may have the same effect and be alternatives to Zr in an underlayer structure according to the invention.

Figure 1:
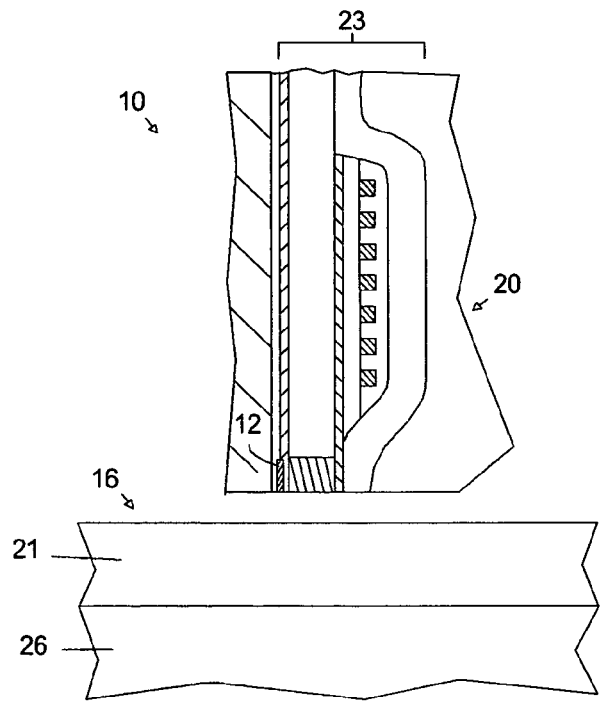
FIG. 1 is a symbolic illustration of the prior art showing the relationships between the head and disk in a disk drive.
Figure 2:
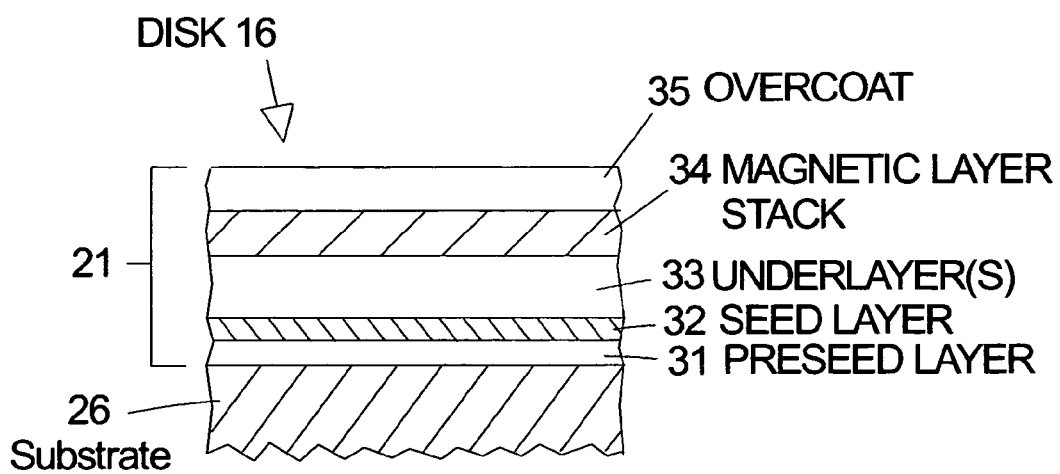
FIG. 2 is an illustration of a prior art layer structure for a magnetic thin film disk.
Figure 3:
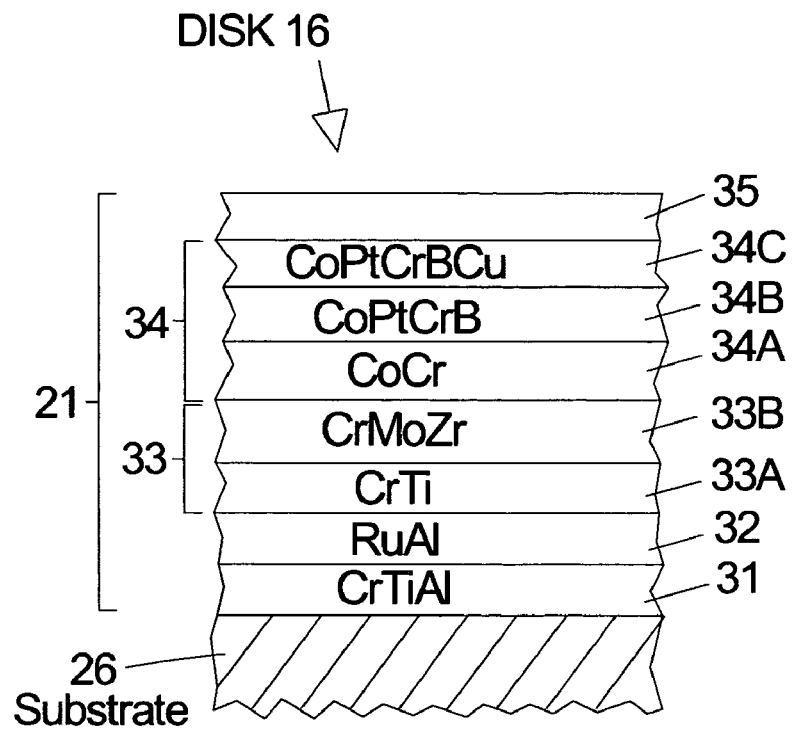
FIG. 3 is an illustration of a layer structure of a magnetic thin film disk according to an embodiment of the invention.

Reference is made to FIG. 3 to illustrate the thin film layers in a preferred embodiment of a magnetic film disk 16. The substrate 26 is preferably circumferentially textured glass, but other similar material can be used. The CrTiAl pre-seed layer 31 is sputter deposited directly onto the substrate surface 26 which may be glass or any other appropriate material or surface. Preferably the substrate surface has been circumferentially textured. The CrTiAl pre-seed layer 31 can be used with a variety of seed layers. The preferred thickness for the CrTiAl pre-seed layer is from 20 nm to 50 nm. The preferred compositional range is from 5 at. % to 20 at. % aluminum with the remainder being approximately equal atomic percentages of chromium and titanium.

The preferred seed layer is RuAl deposited with a B2 crystallographic structure and is, therefore, substantially 50 at. % aluminum. The CrTiAl layer allows the RuAl seed layer 32 to be kept very thin. The underlayer structure 33 may also be kept very thin when CrTiAl is used.

It is known that the cobalt alloy magnetic film can be grown with the in-plane preferred orientation of (11-20) by first depositing an underlayer with a (200) preferred orientation. A RuAl seed layer with a B2 crystallographic structure is used to obtain an underlayer structure with a preferred in-plane orientation of (200) and a cobalt alloy magnetic film with the preferred in-plane orientation of (11-20). The (11-20) PO is important for achieving an orientation ratio greater than one.

The underlayer structure 33 includes a first layer 33A of CrTi with Ti ranging from 10 to 30 at. % with 22 at. % Ti being most preferred. The second layer 33B of the underlayer structure is preferably CrMoZr with CrMoNb or CrMoMn as alternatives. The composition of the CrMoZr is preferably from 10 to 30 at. % Mo; 1 to 10 at. % Zr with the remainder being Cr. A most preferred composition has 20 at. % Mo and 2 at. % Zr.

A variety of cobalt alloys have been used in the prior art for the magnetic layer. Examples of materials suitable for magnetic layers include CoCr, CoPtCr, CoPtCrTa and CoPtCrB. Copper can also be included in the magnetic alloy. The preferred embodiment includes a magnetic layer structure 34 with three layers of ferromagnetic material. The first ferromagnetic layer 34A is preferably CoCr with a preferred composition of from 10 to 37 at. % Cr. The second ferromagnetic layer 34B is preferably CoPtCrB. The third ferromagnetic layer 34C is preferably CoPtCrBCu with 10-28 at. % chromium, 11-18 at. % platinum, 4-18 at. % boron and 1-8 at. % copper. It is preferable that the magnetic layers be applied using a negative voltage bias.

In order to test the effect of the CrMoZr underlayer, two test disks were made. One disk (DISK-B) was as shown in FIG. 3 with a 10 angstrom thick $CrMo_{20}Zr_2$ layer and the other (DISK-A) was identical except that the CrMoZr layer was omitted. The measured properties are given in Table 1.

TABLE 1

| DISK | Mrt memu/cm$^2$ | Hc (Oe) | MrtOR | $\Delta\Theta_{50}$ (°) | DCSNR (dB) | OW (dB) | PW50 (nm) | LF (mV) |
|------|------|------|------|------|------|------|------|------|
| A | 0.37 | 3780 | 1.51 | 6.7 | 33.37 | 30.9 | 92.1 | 1.517 |
| B | 0.39 | 3790 | 1.55 | 6.5 | 33.90 | 30.5 | 93.0 | 1.559 |

Figure 4:
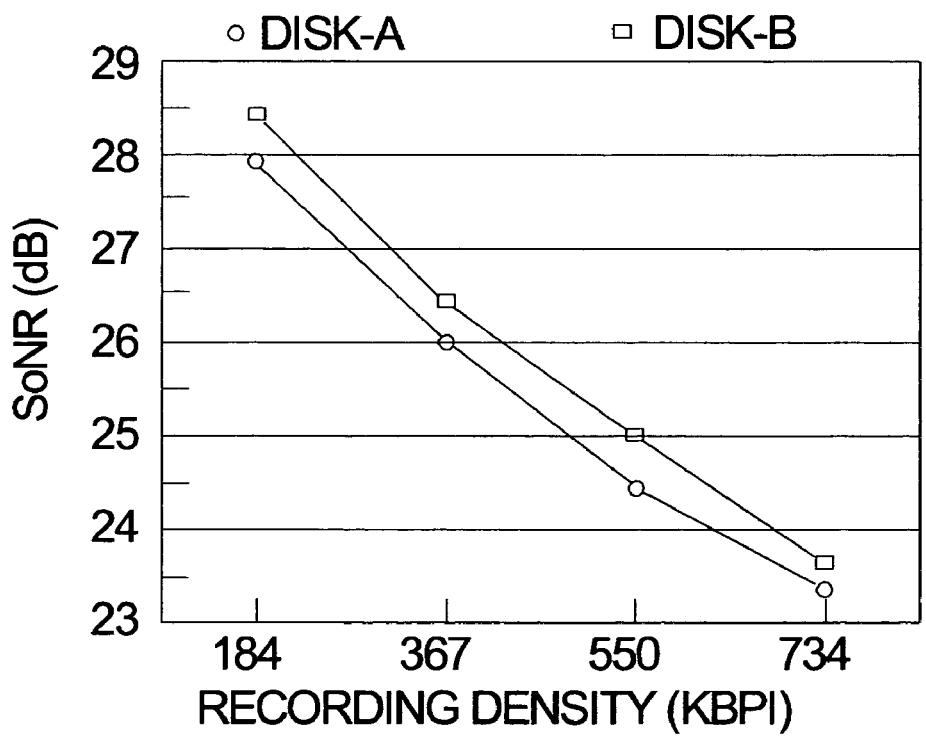
FIG. 4 is a graph of the SoNR measured at varying recording densities for disk-A having no CrMoZr layer and disk-B with a 10 angstroms thick CrMoZr layer according to the invention.

The SoNR was measured for disks A and B for recording densities of 184, 676, 550 and 734 KBPI (kilo-bits per inch) and disk B had a higher SoNR at each density as is shown in the graph of FIG. 4.

The optimal thickness of the $CrMo_{20}Zr_2$ layer for the 2T SoNR measurement was determined to be 10 angstroms. A thickness of 20 angstroms resulted in performance essentially the same as disk A with no CrMoZr layer.

To test the effect of varying the concentration of Zr three test disks were made with 0, 2 and 4 at. % Zr. The results are given in Table 2.

TABLE 2

| DISK | Mrt memu/cm$^2$ | Hc (Oe) | MrtOR | DCSNR (dB) | 2TSoNR (dB) | 1TSoNR (dB) | PW50 (nm) |
|------|------|------|------|------|------|------|------|
| CrMo | 0.380 | 3700 | 1.45 | 33.6 | 25.9 | 17.0 | 94.0 |
| $CrMoZr_2$ | 0.385 | 3750 | 1.51 | 33.80 | 26.1 | 17.3 | 93.5 |
| $CrMoZr_4$ | 0.390 | 3750 | 1.53 | 33.9 | 26.1 | 17.4 | 93.0 |

The results show that 2 at. % Zr in CrMoZr results in improved performance over CrMo. CrMoZr with 4 at. % Zr showed improved performance over the disk with 2 at. % Zr.

The atomic percent compositions given above are given without regard for the small amounts of contamination that invariably exist in sputtered thin films as is well known to those skilled in the art. The invention has been described with respect to particular embodiments, but other uses and applications for the thin film underlayer of the invention will be apparent to those skilled in the art.

The invention claimed is:

1. A thin film magnetic recording medium comprising:
   an amorphous pre-seed layer deposited on a circumferentially textured nonmetallic substrate;
   a seed layer with a B2 crystallographic structure deposited after the amorphous pre-seed layer;
   a first underlayer of a chromium alloy deposited after the seed layer;
   a second underlayer of CrMoZr, CrMoNb or CrMoMn deposited after the first underlayer; and
   a magnetic layer stack including at least one cobalt alloy magnetic layer deposited on the second underlayer.

2. A thin film magnetic recording medium comprising:
   an amorphous pre-seed layer;
   a seed layer with a B2 crystallographic structure deposited after the amorphous pre-seed layer;
   a first underlayer of a chromium alloy deposited after the seed layer;
   a second underlayer of CrMoZr deposited after the first underlayer; the second underlayer having approximately 1 to 10 at. % Zr; and
   a magnetic layer stack including at least one cobalt alloy magnetic layer deposited on the second underlayer.

3. The thin film magnetic recording medium of claim 2 wherein the second underlayer has approximately 10 to 30 at. % Mo.

4. The thin film magnetic recording medium of claim 1 wherein the seed layer is RuAl.

5. The thin film magnetic recording medium of claim 1 wherein the second underlayer is approximately 10 angstroms thick.

6. The thin film magnetic recording medium of claim 1 wherein the magnetic layer stack includes a first ferromagnetic layer of CoCr deposited on the second underlayer.

7. The thin film magnetic recording medium of claim 6 wherein the magnetic layer stack includes a second ferromagnetic layer of CoPtCrB deposited on the first ferromagnetic layer of CoCr.

8. The thin film magnetic recording medium of claim 7 wherein the magnetic layer stack includes a third ferromagnetic layer of CoPtCrBCu deposited on the second ferromagnetic layer of CoPtCrB.

9. The thin film magnetic recording medium of claim 1 wherein the first underlayer is CrTi.

10. The thin film magnetic recording medium of claim 1 wherein the amorphous pre-seed layer is CrTiAl with approximately 5 to 20 at. % aluminum.

11. A method of fabricating a thin film magnetic recording medium comprising the steps of:
   depositing an amorphous pre-seed layer on a circumferentially textured nonmetallic substrate;
   depositing a seed layer with a B2 crystallographic structure after the amorphous pre-seed layer;
   depositing a first underlayer of a chromium alloy after the seed layer;
   depositing a second underlayer of CrMoZr, CrMoNb or CrMoMn after the first underlayer; and
   depositing a magnetic layer stack after the second underlayer, the magnetic layer stack including at least one cobalt alloy magnetic layer.

12. A method comprising:
depositing an amorphous pre-seed layer;
depositing a seed layer with a B2 crystallographic structure after the amorphous pre-seed layer;
depositing a first underlayer of a chromium alloy after the seed layer;
depositing a second underlayer of CrMoZr after the first underlayer, the second underlayer having approximately 1 to 10 at. % Zr; and
depositing a magnetic layer stack after the second underlayer, the magnetic layer stack including at least one cobalt alloy magnetic layer.

13. The method of claim 12 wherein the CrMoZr has approximately 10 to 30 at. % Mo.

14. The method of claim 11 wherein the second underlayer is approximately 10 angstroms thick.

15. The method of claim 11 wherein the magnetic layer stack includes a first ferromagnetic layer of CoCr deposited on the second underlayer.

16. The method of claim 15 wherein the magnetic layer stack includes a second ferromagnetic layer of CoPtCrB deposited on the first ferromagnetic layer of CoCr.

17. The method of claim 16 wherein the magnetic layer stack includes a third ferromagnetic layer of CoPtCrBCu deposited on the second ferromagnetic layer of CoPtCrB.

18. The method of claim 11 wherein the first underlayer is CrTi.

19. The method of claim 11 wherein the amorphous pre-seed layer is CrTiAl with approximately 5 to 20 at. % aluminum.

20. The method of claim 11 wherein the seed layer is RuAl.

21. A disk drive comprising:
a magnetic transducer including a read and a write head; and
a magnetic thin film disk on which the write head writes magnetic transitions, the magnetic thin film disk including:
an amorphous pre-seed layer deposited on a circumferentially textured nonmetallic substrate;
a seed layer with a B2 crystallographic structure deposited after the amorphous pre-seed layer;
a first underlayer of a chromium alloy deposited after the seed layer;
a second underlayer of CrMoZr, CrMoNb or CrMoMn deposited after the first underlayer; and
a magnetic layer stack including at least one cobalt alloy magnetic layer deposited on the second underlayer.

22. A disk drive comprising:
a magnetic transducer including a read and a write head; and
a magnetic thin film disk on which the write head writes magnetic transitions, the magnetic thin film disk including:
an amorphous pre-seed layer;
a seed layer with a B2 crystallographic structure deposited after the amorphous pre-seed layer;
a first underlayer of a chromium alloy deposited after the seed layer;
a second underlayer of CrMoZr with approximately 1 to 10 at. % Zr; and
a magnetic layer stack including at least one cobalt alloy magnetic layer deposited on the second underlayer.

23. The disk drive of claim 22 wherein the CrMoZr has approximately 10 to 30 at. % Mo.

24. The disk drive of claim 21 wherein the seed layer is RuAl.

25. The disk drive of claim 21 wherein the amorphous pre-seed layer is CrTiAl with approximately 5 to 20 at. % aluminum.

26. The disk drive of claim 21 wherein the second underlayer is approximately 10 angstroms thick.

27. The disk drive of claim 21 wherein the first underlayer is CrTi, the second underlayer is CrMoZr, the magnetic layer stack includes a first ferromagnetic layer of CoCr deposited on the second underlayer, the magnetic layer stack includes a second ferromagnetic layer of CoPtCrB deposited on the first ferromagnetic layer of CoCr, and the magnetic layer stack includes a third ferromagnetic layer of CoPtCrBCu deposited on the second ferromagnetic layer of CoPtCrB.

* * * * *